United States Patent [19]

Li et al.

[11] Patent Number: 4,663,050

[45] Date of Patent: May 5, 1987

[54] SEMIPERMEABLE MEMBRANES PREPARED FROM POLYMERS CONTAINING ADJACENT, PENDENT CARBOXY GROUPS

[75] Inventors: George S. Li, Macedonia; William M. Giffen, Jr., Hudson, both of Ohio

[73] Assignee: Standard Oil Company, Cleveland, Ohio

[21] Appl. No.: 500,116

[22] Filed: Jun. 1, 1983

Related U.S. Application Data

[63] Continuation-in-part of Ser. No. 339,911, Jan. 18, 1982, abandoned.

[51] Int. Cl.$^4$ ............................................. B01D 13/00
[52] U.S. Cl. .................................... 210/649; 210/640;
  210/654; 210/500.27; 210/500.28; 210/500.34;
  210/500.36; 210/500.37; 210/500.42; 55/16
[58] Field of Search ............... 210/650, 651, 652, 654,
  210/500, 500.27, 500.28, 500.34, 500.36, 500.37,
  500.42, 640, 649; 55/158, 16; 428/220; 204/296;
  429/249, 253, 254

[56] References Cited

U.S. PATENT DOCUMENTS

| | | | |
|---|---|---|---|
| 3,696,031 | 10/1972 | Credali et al. | 210/23 |
| 4,197,148 | 4/1980 | Shimomura | 156/79 |
| 4,250,029 | 2/1981 | Kiser et al. | 210/654 X |
| 4,289,668 | 9/1981 | Li | 260/23 AR |
| 4,292,417 | 9/1981 | Ishii et al. | 525/510 |
| 4,302,336 | 11/1981 | Kawaguchi et al. | 210/654 |

OTHER PUBLICATIONS

Sourirajan, S., *Reverse Osmosis and Synthetic Membranes*, Nat. Res. Con. of Canada, NRCC 13627, 1977, pp. 5–13, 19–21, 202 and 534–536.

*Primary Examiner*—David Sadowski
*Attorney, Agent, or Firm*—G. R. Plotecher

[57] ABSTRACT

Semipermeable membranes useful for separating mixtures of ethanol and water into enriched fractions of each are prepared by cross-linking 50–90 weight percent of at least one polymer containing pendent, adjacent carboxy groups with 10–50 weight percent of at least one diamine. Membranes prepared from copolymers of maleic anhydride and styrene cross-linked with a polyoxyalkylene diamine are exemplary. These membranes are also useful in gas separation processes, such as separating oxygen from nitrogen.

17 Claims, No Drawings

SEMIPERMEABLE MEMBRANES PREPARED FROM POLYMERS CONTAINING ADJACENT, PENDENT CARBOXY GROUPS

CROSS-REFERENCE TO RELATED APPLICATION

This is a continuation-in-part of application Ser. No. 339,911, filed Jan. 18, 1982, abandoned.

BACKGROUND OF THE INVENTION

1. Field of the Invention:

This invention relates to semipermeable membranes. In one aspect, the invention relates to semipermeable membranes prepared from polymers containing adjacent, pendent carboxy groups while in another aspect, the invention relates to the use of these membranes to separate various mixtures, such as ethanol and water or oxygen and nitrogen, into their constituent parts.

2. Description of the Prior Art:

The art is replete with teachings describing various semipermeable membranes, their preparation and use. For example, U.S. Pat. No. 4,292,417 teaches a semipermeable membrane composed of a water-insoluble, cross-linked, membrane-forming polymer where part of its hydroxyl groups are converted to sulfuric acid groups prior to use. This membrane is taught to be generally useful in reverse osmosis processes. U.S. Pat. No. 3,696,031 also describes a membrane useful for reverse osmosis applications, this membrane having a polyamide structure obtained by a reacting piperazine with a dicarboxylic aliphatic, cycloaliphatic or aromatic acid. This patent also discloses several other patents and publications which describe membranes and methods for their preparation.

While the membranes of the above teachings and others all displayed some level of utility, their exists a continuing search for new membranes and new applications for both new and known membranes. One application where the use of membrane technology may prove beneficial is in the separation of ethanol-water mixtures into their component or constituent parts. Presently, crude fermentation mixtures (8–12 wt percent ethanol in water) are separated by a multiple distillation process which is energy intensive. A separation process based upon membrane technology could potentially accomplish the same result but require only half the amount of energy.

Another application where the use of membrane technology may prove beneficial is in the separation of oxygen from nitrogen, e.g. the separation of oxygen from air. Oxygen-enriched air has a plurality of present and potential uses, such as in metal and chemical production and the expected synfuel industry, and alternatives to the expensive cryogenic air separation techniques of today are continually sought by industry.

SUMMARY OF THE INVENTION

The subject of this invention is a semipermeable membrane comprising about:

(a) 50–90 weight percent of at least one polymer containing pendent, adjacent carboxy groups, and
(b) 10–50 weight percent of at least one long-chain diamine having a weight average molecular weight of at least about 2000.

While these membranes are particularly useful for separating ethanol-water mixtures into their constituent parts, these membranes can be used in other applications, including reverse osmosis and various gas separation processes. Moreover, these membranes are easily prepared and demonstrate good durability.

DETAILED DESCRIPTION OF THE INVENTION

The polymer containing the pendent, adjacent carboxy groups can be prepared in any suitable manner and from a wide variety of materials. As here used, "carboxy group" means a group of the formula

where X is hydrogen, $C_1$–$C_4$ alkyl, carbonyl

or a cation that balances the negative charge of the adjacent oxygen, such as $NH_4^+$. Where X is a carbonyl, the adjacent carboxy groups are joined together to form an anhydride group. The carboxy groups can be joined directly to the polymer backbone, e.g.

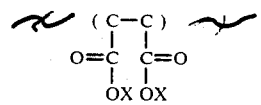

or joined indirectly to the polymer backbone, e.g.

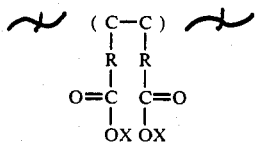

where each R is independently some divalent connecting group such as methylene ($-CH_2-$), ethylene ($-CH_2-CH_2-$), etc. The nature of R can vary widely but is preferably or an oxygen-containing hydrocarbon. Each carboxy group is adjacent (pendent from adjoining atoms in the polymer backbone) to at least one other carboxy group throughout essentially the entire polymer.

Typically, the polymer is a copolymer prepared from about 3–50 molar parts of maleic anhydride and about 97–50 molar parts of at least one vinyl monomer. Although maleic anhydride is the monomer of choice for the source of the pendent, adjacent carboxy groups, analogs of this material can also be used such as maleic acid, an ester (preferably a $C_1$–$C_4$ alkyl ester) of maleic acid, and other $\alpha,\beta$-unsaturated dicarboxylic acids, anhydrides or their lower ($C_1$–$C_4$) alkyl esters where a carbon to carbon double bond is in an $\alpha,\beta$-position to both of the carboxy functions. The carboxy functions of these compounds are, as expected, pendent from the polymer backbone and are adjacent to at least one other carboxy group (or joined to form an anhydride group), i.e.

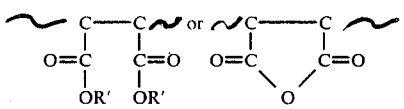

where each R' is independently X except for carbonyl. Because two maleic anhydride or analogous monomers seldom vinyl polymerize with one another, usually the carboxy groups in polymers made from these monomers are adjacent to only one other carboxy group, e.g.

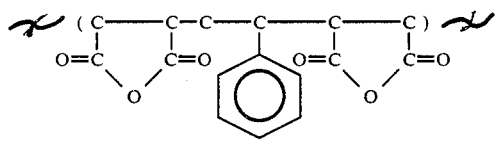

These analogs are further described at column 3 of U.S. Pat. No. 4,289,668, the disclosure of which is here incorporated by reference.

Any vinyl monomer or combination of vinyl monomers that will polymerize with maleic anhydride or one of its analogs to form a polymer with a carbon backbone can be employed in this invention. The nature of the vinyl monomer is generally not critical to this invention as these materials serve primarily as connective moieties for the $\alpha,\beta$-unsaturated compounds in forming the copolymers. Suitable vinyl monomers contain up to about 18 carbon atoms, preferably between 2-10 carbon atoms, and include both aliphatic and aromatic compounds as described in columns 2 and 3 of U.S. Pat. No. 4,289,668. Particurlarly preferred vinyl monomers are styrene and its various derivatives.

Any method that will produce a polymer containing about 3-50, preferably about 6 to 50, mole percent of polymerized monomers containing pendent, adjacent carboxy groups can be used to prepare the polymers used in this invention. Examples of polymerization reactions that can be used to produce the polymers employed here can be found in U.S. Pat. Nos. 2,615,845 (maleic anhydride and $\alpha$-olefins); 2,988,539 (maleic anhydride and vinyl compounds); 3,087,893 (maleic anhydride and esters of unsaturated monocarboxylic acids); 3,451,979 (maleic anhydride and styrene), and others.

Particularly preferred polymers are those made by reacting maleic anhydride (or maleic acid or a lower alkyl ester of one of the acids) with styrene or methyl styrene.

The weight average molecular weight of the polymers or here used generally range from about 10,000 to about 200,000, preferably between 50,000 and 100,000. Polymers having weight average molecular weights outside the broad range can be used but are generally disfavored because those having weight average molecular weights below about 10,000 tend to form physically weak membranes while those having weight average molecular weights in excess of 200,000 are difficult to process during membrane manufacture.

The long-chain diamines here used function as cross-linkers to tie the various polymer chains together into a membrane fabric, thus imparting to the fabric both strength and flexibility. The exact sturcture and nature of these materials can vary as long as they effectively cross-link the polymer chains. Typically, these materials are relatively long and linear molecular chains terminated at each end with an amine group, preferably with little or no branching and free of macrocyclic components pendent from or a part of the polymer backbone. The composition of the chain can vary widely and includes such diverse materials as polyoxyalkylenes, polyalkylenes, polyamides and the like. The weight average molecular weight of these materials is generally at least about 2,000 and preferably between 2,000 and 10,000. Jeffamine D-2000, a polyoxypropylene diamine with a molecular weight of about 2,000 and manufactured by the Jefferson Chemical Company, is a preferred diamine. Another preferred diamine is a polybutadiene with a weight average molecular weight between 2,000 and 10,000 and terminated at each end with an amine group.

The membrane can be manufactured by any conventional method. In one embodiment, the polymer containing the pendent, adjacent carboxy groups is dissolved in some suitable solvent to form about a 1-20, preferably 5-10, weight percent solution. Generally any polar solvent can be employed with chloroform, dimethylformamide, dimethylsulfoxide, dimethylacetamide, acetone and methylethyl ketone being exemplary. A 1-20, preferably 5-10, weight percent solution of the cross-linker or diamine is prepared, generally in the same solvent used to prepare polymer solution, and then the two solutions are mixed at room temperature. The resulting mixture is then poured over a clean glass plate and spread evenly to a uniform thickness with the aid of a doctor's blade. The membranes are then air dried, removed from the glass plate and further dried in air under ambient conditions for a suitable period of time, generally in excess of 24 hours. Cross-linking and solvent evaporation (removal) occur concurrently throughout the drying step. In other embodiments, these membranes can be manufactured by the various laboratory and commercial techniques known in the art. These membranes can also be manufactured into structures other than films, such as hollow fibers, and can be used per se, coated onto a compatible support, or used as a support in combination with a compatible coating.

While sufficient cross-linker is mixed with the polymer containing the carboxy groups to form a durable, functional membrane of at least about 50 weight percent polymer, generally the membrane contains many unreacted carboxy groups. These groups impart hydrophilicity to the membrane and help define its flux. Where maleic anhydride is used in the preparation of the polymer, the resulting anhydride group can be modified to enhance the membrane flux. In one embodiment, the polymer is exposed to water to hydrolyze one or more of the anhydride groups to the corresponding acid groups while in another embodiment, the resulting acid groups are contacted with ammonium hydroxide to form the amine salt of the acid group. In yet another embodiment, the anhydride group can be converted directly to the amine salt of the carboxy derivative by simply contacting the polymer with ammonium hydroxide. These modifications can be accomplished either prior to forming the membrane or subsequent to its formation although the latter is preferred. In the case of modifying the anhydride group subsequent to membrane formation, the modification can take place either prior to use of the membrane or as the membrane is used. Of course, when using a membrane modified to an ammonium salt derivative, the pH of the permeant should be maintained above 7 to avoid reversion of the salt derivative back to the carboxy acid form.

The semipermeable membranes of this invention find particular utility for the separation of ethanol-water mixtures into their constituent parts, i.e. enriched fractions of ethanol and water. However, these membranes also have utility for separating other mixtures, such as water-aldehyde, salt water, carboxylic acid-water, and other water solutions or mixtures. These membranes selectively allow the water portions of the permeant mixtures to pass through them while selectively rejecting the nonaqueous portion of the permeant mixture. These membranes can be used in any one of a number of different manners including both reverse osmosis and pervaporation, the latter described in some detail in the examples.

The semipermeable membranes of this invention also find particular utility for the separation of oxygen from nitrogen, such as the separation of oxygen from air. However, these membranes can also be used in other gas separations, such as $CO_2$ from $CH_4$, $H_2$ from $NH_3$ or $N_2$, and the like. These membranes are used in the same manner as known membranes and can be cast in any one of a number of different configurations, typically either as a flat sheet or as a hollow fiber.

The membranes of this invention can be cast at any desirable thickness although membranes having a thickness between 25 mils (1 mil equals 25 micrometers) and 1,000 angstroms, preferably between 10 mils and 1,000 angstroms are most desirable. These membranes demonstrate good water permeability, durability, flexibility, strength and salt resistance.

The following examples are illustrative of specific embodiments of this invention and unless indicated to the contrary, all parts and percentages are by weight.

SPECIFIC EMBODIMENTS

I. Ethanol/Water Separation

A. Membrane Preparation

All the membranes here tested were prepared from polymers either prepared by the methods disclosed in the patents cited above or were commercially acquired. The membranes themselves were prepared by mixing a dilute (about 5-10 weight percent) solution of polymer in a suitable solvent, typically methylethyl ketone or acetone, with a cross-linker, the latter itself dispersed in a dilute solution (about 5-10 weight percent) of the same solvent as that used to solubilize the polymer. After the two dilute solutions were thoroughly mixed, they were poured over a clean glass plate and spread evenly to a uniform thickness with the aid of a doctor's blade, air dried, removed from the glass plate, and further dried in air at ambient conditions for at least 24 hours. Where no cross-linker was employed, the dilute polymer solution was simply poured upon the glass plate and dried in the same manner.

B. Apparatus and Procedure

The selectivity and permeation (flux) factors for each of the membranes examined in the following examples were determined on a pervaporation apparatus. This apparatus consisted simply of an upper chamber and a lower chamber separated by the membrane. The membrane was mounted between the two chambers by supporting it upon a filter paper underlay which was supported by a wire mesh screen which itself was supported by a porous steel plate. The various supports were separated from one another by rubber O-ring seals which were also used to separate the top surface of the membrane from the upper chamber and the bottom surface of the porous steel plate from the lower chamber. The upper chamber was connected to a circulation pump which kept a constant volume (liquid full) of permeant in the chamber at a constant pressure while the lower chamber was connected to a vacuum pump that maintained a good vacuum in that chamber. The lower chamber was also connected to various cold traps to collect the permeate that passed through the membrane from the upper chamber.

In all the examples, a liquid permeant (10 weight percent ethanol/90 weight percent water) was introduced into the upper chamber with a pressure head of about 0.2 atmospheres. This pressure combined with a vacuum of about 0.1 mm Hg in the lower chamber gave a total pressure differential (permeation driving force) across the membrane of about 1.2 atmospheres. The circulation pump connected to the upper chamber kept the permeant volume and pressure relatively constant over the full course of each run. The permeant liquid penetrated the top surface of the membrane, coursed through the membrane and evaporated off the bottom surface of the membrane. The permeate vapors were constantly removed by the vacuum system and collected by two cold traps connected in series.

Those membranes that were modified prior to a separation run were either modified by exposing the film to water prior to its insertion into the apparatus or by exposing the film to water after its insertion to the apparatus but before the vacuum was drawn. Those membranes that were modified to the amine salt of the carboxy group were contacted with a 0.1-2 weight percent solution of ammonium hydroxide prior to insertion of the membrane into the apparatus. The thickness of the various membranes ranged from 1.1 mils to 14.0 mils with most being less than 6 mils.

C. Results

The following table details the results of a number of different experiments. In the description of the membrane film, the composition, in mole percent, of the polymer is given in the first line and the proportion, in weight percent, of the polymer and diamine (P/D) is given in the second line. Unless noted to the contrary, the diamine in each case was Jeffamine D-2,000.

The permeate composition in all number examples, except for Examples 4 and 5, consisted of more than 99 weight percent water and less than 1 weight percent ethanol and for Examples 4 and 5, more than 97 weight percent water and less than 3 weight percent ethanol. The permeate composition in each example, both control and invention, were measured by gas chromatography analysis after the membrane had reached steady-state operation, always between 4 and 30 hours of operation and typically between 19 and 24 hours of operation.

The separation factor was calculated by the following formula:

$$\text{Separation Factor} = \frac{\dfrac{\text{percent } H_2O \text{ in Permeate}}{\text{percent Ethanol in Permeate}}}{\dfrac{\text{percent } H_2O \text{ in Permeant}}{\text{percent Ethanol in Permeant}}} \quad (I)$$

The permeation factor is expressed in units of grams per day per 100 square inches of membrane surface area per the reciporical of membrane thickness in mils per one atmosphere of pressure differential across the membrane. Those examples preceded by a letter are control runs while those examples proceeded by a number are within the scope of the invention.

TABLE I

SEPARATION CHARACTERISTICS OF VARIOUS SEMIPERMEABLE MEMBRANES
Ethanol:Water Weight Ratio for All Example - 10:90

| Ex | Membrane Composition | Separation Factor | Permeation Factor $\left( \dfrac{\text{g-mil}}{100 \text{ in}^2 \text{ atm day}} \right)$ |
|---|---|---|---|
| 1 | 50% Styrene/50% MAH[a] P/D = 85/15 | 13.8 | 35 |
| 2 | 94% Styrene/6% MAH (modified to NH$_4^+$ salt) P/D = 71/29 | 22.1 | 88 |
| 3 | 50% Diisobutylene/50% MAH P/D = 57/43 | 15.8 | 84 |
| 4 | 50% Ethylene/50% MAH P/D = 50/50 | 4.2 | 57 |
| 5 | Composition of (4) with MAH units hydrolyzed to maleic acid units | 4.1 | 2,565 |
| 6 | 50% Styrene/50% MAH P/D = 67/33 | 36.9 | 25 |
| 7. | 50% Styrene/50% MAH P/D = 50/50 | 22.1 | 179 |
| 8. | Same as (7) with MAH units hydrolyzed to maleic acid units | 22.1 | 218 |
| 9. | 94% Styrene/6% MAH P/D = 71/29 | 55.4 | 16 |
| 10. | Same as (9) but modified to NH$_4^+$ salt | 27.7 | 87 |
| 11. | 75% Styrene/25% MAH P/D = 67/33 | 18.4 | 12 |
| 12. | Same as (11) but MAH units hydrolyzed to maleic acid units | 15.8 | 24 |
| 13. | Same as (11) but modified to NH$_4^+$ salt | 12.2 | 937 |
| A. | Polyvinyl Alcohol | 2.1 | 1,210 |
| B. | Sulfonated PPO[b] | 4 | 3,350 |
| C. | Cellulose Triacetate | 2.7 | 30 |
| D. | Poly(methacrylic acid) P/D = 50/50 | 1.6 | 54 |
| E. | Poly(acrylic acid) P/D = 50/50 | 1.6 | 178 |
| F. | Same as (E) but converted acid units to NH$_4^+$ salts | 1.1 | 1,288 |
| G. | 90% Acrylonitrile/10% Ethyl Acrylate | 27.7 | 3.4 |
| H. | Ethyl Cellulose | 2.8 | 68 |
| I. | Polysulfone | 11 | 12.5 |
| J. | Phenoxy Resin | 13.8 | 17 |
| K. | Cellulose Acetate | 4.9 | 89 |

[a]MAH = Maleic Anhydride
[b]Polyphenylene Oxide with about 30 mole percent - SO$_3$H units.

Generally for a semipermeable membrane to have any practical utility for separating mixtures of ethanol and water, it should have a selectivity factor in excess of three, preferably in excess of 10, and a permeation factor in excess of 10, preferably in excess of 20. For both factors, usually the higher the number the more useful the membrane. As the data of the above Table shows, the membranes of this invention are particularly well suited for ethanol/water separations, particularly those prepared from styrene and maleic anhydride. The data also demonstrates that modification of pendent anhydride groups to the corresponding acid or NH$_4^+$ salts groups significantly increases the permeation factor without significant change to the selectivity factor. While many of the Control membranes have very good permeation factors, most have very undesirable selectivity factors. Moreover, of those few (B, I, J and K) that have both passable selectivity and permeation factors, none have a combination of factors comparable to the better, e.g. 7, 8, and 13, membranes of the invention.

A comparison of Controls D and E with Examples 3, 4, 5 7, and 8 shows the significance of having the pendent carboxy groups adjacent to at least one other carboxy group. The carboxy groups of the polymers used in Controls D and E are essentially all nonadjacent to one another.

II. Oxygen/Nitrogen Separation

A. Membrane Preparation

The membranes here used were prepared in the same manner as the membranes used in the ethanol/water separation examples.

B. Apparatus and Procedure

A modified Gilbert Cell was used to test the permeation of the films. The test side was exposed to an oxygen/nitrogen mixture in a mole ratio of 21.3:78.7. The permeant was picked up by a carrier gas, helium, and injected intermittently through a sample value into a GC column for analysis. The experiments were conducted at 23° C., the partial pressure of the test gas on the feed side was 29.8 psi, absolute, and the partial pressure of the product gas on the permeant was about 0 and purged with 29.8 psi, absolute, helium at a flowrate much in excess of the permeation rate. The area of the test membrane was about 7.1 square inches. The film thickness was between 1 and 2 mils.

The oxygen permeability and and oxygen/nitrogen selectivity figures are reported Table II.

TABLE II

SEPARATION CHARACTERISTICS OF SEMIPERMEABLE MEMBRANES

| Ex | Membrane Composition | Separation Factor O$_2$N$_2$ | Permeation Factor (O$_2$) $\dfrac{\text{cc(STP) cm}}{\text{cm}^2 \text{ sec cm(Hg)}} \times 10^{-10}$ |
|---|---|---|---|
| 14. | 50% Diisobutylene/ 50% MAH P/D = 57/43 | 4 | 3.87 |
| 15. | 94% Styrene/ 6% MAH P/D = 57/43 | 3.86 | 4.2 |
| 16. | 50% Octadecene/ 50 MAH P.D = 57/43 | 2.82 | 27.2 |

The above data clearly demonstrate the effectiveness of these membranes in the separation of oxygen from nitrogen. Membranes having a separation factor in excess of 2.5 are considered good.

The permeation factor, expressed in barrers, is expressed as the quotient of the product of product gas volume (cc, STP) times membrane thickness (cm) divided by the product of membrane surface area (cm$^2$) times the pressure differential across the membrane (cm Hg) times the period of separation (sec). The factor $10^{-10}$ is simply used for convenience. The separation factor was calculated by taking the ratio of the various permeation factors, i.e.

$$\text{Separation Factor} = \frac{\text{O}_2 \text{ Permeation Factor}}{\text{N}_2 \text{ Permeation Factor}}$$

While this invention has been described in considerable detail by the preceding examples, this detail is provided for the purpose of illustration only and is not to be construed as limitations upon the invention as described in the following claims.

What is claimed is:

1. A semipermeable membrane comprising about:
   (a) 50–90 weight percent of at least one polymer containing pendent, adjacent carboxy groups, and
   (b) 10–50 weight percent of at least one long-chain diamine having a weight average molecular weight of at least about 2,000.

2. The membrane of claim 1 where the polymer is a copolymer prepared from about
   (a) 3–50 molar parts of a monomer selected from maleic anhydride, maleic acid, an ester of maleic acid, and $\alpha,\beta$-unsaturated dicarboxylic acids, anhydrides and their lower alkyl esters where a carbon to carbon double bond is an $\alpha,\beta$-position to both of the carboxy functions, and
   (b) 97–50 molar parts of at least one vinyl monomer.

3. The membrane of claim 2 where the monomer of (a) is selected from maleic anhydride, maleic acid and a $C_1$–$C_4$ alkyl ester of maleic acid.

4. The membrane of claim 3 where the vinyl monomer of (b) is selected from aliphatic and aromatic compounds having up to about 18 carbon atoms.

5. The membrane of claim 4 where the vinyl monomer is styrene.

6. The membrane of claim 5 where the monomer of (a) is maleic anhydride.

7. The membrane of claim 6 where the copolymer is prepared from about 6–50 molar parts of maleic anhydride and about 94–50 molar parts styrene.

8. The membrane of claim 7 where the weight average molecular weight of the polymer is between about 10,000 and 200,000.

9. The membrane of claim 8 where the weight average molecular weight of the polymer is between about 50,000 and 100,000.

10. The membrane of claim 9 where the diamine is a substantially linear polyoxyalkylene terminated at each end with an amine group.

11. The membrane of claim 10 where the diamine is a substantially linear polyoxypropylene terminated at each end with an amine group.

12. The membrane of claim 11 where the diamine has a weight average molecular weight of between about 2,000 and 10,000.

13. The membrane of claim 12 where at least part of the carboxy groups are acid groups.

14. The membrane of claim 12 where at least part of the carboxy groups are $NH_4^+$ salts.

15. The membrane of claim 12 having a thickness between 25 mils and 1,000 angstroms.

16. A process of separating a liquid mixture of ethanol and water into enriched fractions of each, the process comprising contacting the mixture with the membrane of claim 1 in such a manner that the water portion of the mixture is selectively passed through the membrane while the ethanol portion of the mixture is selectively rejected by the membrane.

17. A process of separating a gaseous mixture containing oxygen and nitrogen into enriched fractions of each, the process comprising contacting the mixture with the membrane of claim 1 in such a manner that the oxygen portion of the mixture is selectively passed through the membrane while the nitrogen portion of the mixture is selectively rejected by the membrane.

* * * * *